United States Patent
Wright

(10) Patent No.: US 12,291,327 B1
(45) Date of Patent: May 6, 2025

(54) AIRCRAFT WITH MODULAR COMPONENTS

(71) Applicant: Cummings Aerospace, Inc., Huntsville, AL (US)

(72) Inventor: Charles Wayne Wright, Huntsville, AL (US)

(73) Assignee: Cummings Aerospace, Inc., Huntsville, AL (US)

( * ) Notice: Subject to any disclaimer, the term of this patent is extended or adjusted under 35 U.S.C. 154(b) by 0 days.

(21) Appl. No.: 18/227,756

(22) Filed: Jul. 28, 2023

(51) Int. Cl.
*B64C 29/00* (2006.01)
*B64C 1/06* (2006.01)
*B64U 20/40* (2023.01)

(52) U.S. Cl.
CPC .......... *B64C 29/0025* (2013.01); *B64C 1/069* (2013.01); *B64U 20/40* (2023.01); *B64C 2211/00* (2013.01)

(58) Field of Classification Search
CPC . B64C 29/0025; B64C 2211/00; B64C 1/069; B64C 1/26; B64U 20/40; B64U 50/12; B64U 50/18; B64U 50/19
See application file for complete search history.

(56) References Cited

U.S. PATENT DOCUMENTS

| | | | |
|---|---|---|---|
| 7,234,667 B1* | 6/2007 | Talmage, Jr. .......... | B64D 25/12 244/120 |
| 11,981,460 B2* | 5/2024 | Muceus ................. | B64U 30/10 |
| 2007/0215751 A1* | 9/2007 | Robbins ................. | B64U 50/18 244/55 |
| 2012/0091257 A1* | 4/2012 | Wolff ..................... | B64U 30/26 244/12.4 |
| 2017/0320570 A1* | 11/2017 | Horn ...................... | B64C 29/02 |
| 2019/0329882 A1* | 10/2019 | Baity ..................... | B64U 30/14 |
| 2021/0197965 A1* | 7/2021 | Kunz ................... | B64C 29/0025 |
| 2022/0001974 A1* | 1/2022 | Page ....................... | B64C 25/04 |

* cited by examiner

*Primary Examiner* — Rodney A Bonnette
(74) *Attorney, Agent, or Firm* — Bradley Arant Boult Cummings LLP; Ryan J. Letson; Alex H. Huffstutter

(57) ABSTRACT

In some embodiments, an aircraft may have components with one or more channels configured to receive one or more rigid tubes passing through one or more components of the aircraft. A tube may be disposed within a first channel of a first component of the aircraft and may pass into and through a second channel of a second component of the aircraft. The tube may improve positioning and fit of the modular components of the aircraft, thereby improving stiffness and performance of the aircraft. The tubes also may improve efficiency when assembling the aircraft and coupling modular components of the aircraft to one another. Further, conductive wiring components of the aircraft may be routed internally within the tubes to achieve improved wire routing management and protection for wiring components.

15 Claims, 10 Drawing Sheets

AIRCRAFT WITH MODULAR COMPONENTS

BACKGROUND

Manned and unmanned aircraft are used for a variety of missions and in a variety of locations. Frequently, unmanned aircraft are used for operations in which use of a human operated aircraft carries undesirable tradeoffs or risks. For example, unmanned aircraft may be used when operations carry a high risk of loss of or damage to the aircraft, such as military operations. Unmanned aircraft also may be used in situations where manned aircraft, which typically must be sized and configured to accommodate human pilots, may be unable to achieve performance needed to accomplish the operation.

Unmanned aircraft are used for a variety of operations across various contexts. These operations carry a variety of aircraft performance requirements. For example, an operation may require an aircraft capable of achieving a particular speed, altitude, range, or maneuverability in order to perform the operation successfully. If an aircraft capable of meeting such requirements is unavailable, the operation may be delayed until an aircraft with suitable performance capabilities is available.

In addition, aircraft systems and parts need periodic servicing, including maintenance and replacement of major aircraft components. Aircraft increasingly operate in remote areas, away from suppliers who can provide service components quickly. This also carries a risk that the operation may be delayed until suitable service components are available and implemented. Improved techniques for modifying aircraft performance and aircraft components are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

A. Definitions

Figure 1:
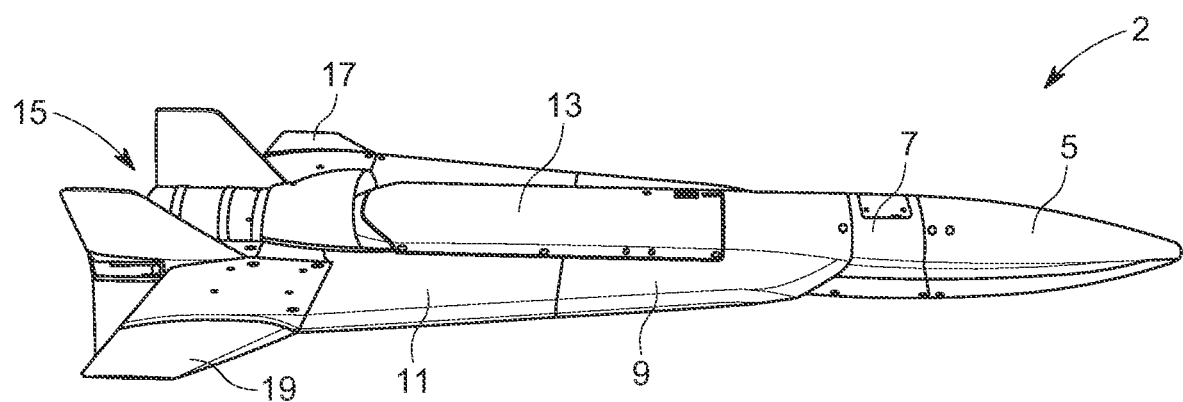
FIG. 1 depicts a three-dimensional perspective view of an aircraft with modular components in accordance with some embodiments of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the apparatus is right side up.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

The terms "port" and "starboard" shall have their same meanings as used in the aeronautics community. For avoidance of doubt, the term "port" shall refer to a left side of an aircraft when facing the bow or front of the aircraft. The term "starboard" shall refer to a right side of an aircraft when facing the bow or front of the aircraft.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

B. Aircraft with Modular Components

The present disclosure describes various aspects of some embodiments of an aircraft with modular components. In some embodiments, the aircraft may have modular components to allow a user to modify a configuration of the aircraft as desired, such as to upgrade, reconfigure, or maintain the aircraft.

In some embodiments, an aircraft may have components with one or more channels configured to receive one or more rigid tubes passing through one or more components of the aircraft. A tube may be disposed within a first channel of a first component of the aircraft and may pass into and through a second channel of a second component of the aircraft. The tube may improve positioning and fit of the modular components of the aircraft, thereby improving stiffness and performance of the aircraft. The tubes also may improve efficiency when assembling the aircraft and coupling modular components of the aircraft to one another. Further, conductive wiring components of the aircraft may be routed internally within the tubes to achieve improved wire routing management and protection for wiring components.

FIG. 1 depicts a three-dimensional perspective view of an aircraft 2 with modular components in accordance with some embodiments of the present disclosure. The aircraft 2 of FIG. 1 is an unmanned aircraft, although it will be understood that in some embodiments, the techniques and features ascribed to the aircraft 2 herein may be implemented in a manned aircraft.

The aircraft 2 of FIG. 1 includes a payload housing 5, an avionics housing 7, a forward fuselage 9, aft fuselage 11, a fuel module 13, a propulsion tail 15, and elevons 17, 19. Additional details of the features of these components are included and described further below.

Aircraft 2 may have dimensions selected by a user for various purposes, such as to achieve a desired performance of the aircraft, to complete a desired mission or operation, or to allow the aircraft 2 to operate according to certain operational constraints (e.g., transportation limits, requirements hand launching by a user, etc.). In some cases, the aircraft 2 may have dimensions limited by sizing constraints of three-dimensional printing devices used to fabricate the components of the aircraft. In some embodiments, dimensions of the aircraft may vary based on configuration of the aircraft, such as whether the aircraft 2 comprises a particular type of fuel module, propulsion tail (e.g., depending on whether a user requires vertical takeoff/landing, horizontal takeoff/landing, or hand-launch and retrieval operation).

Figure 2:
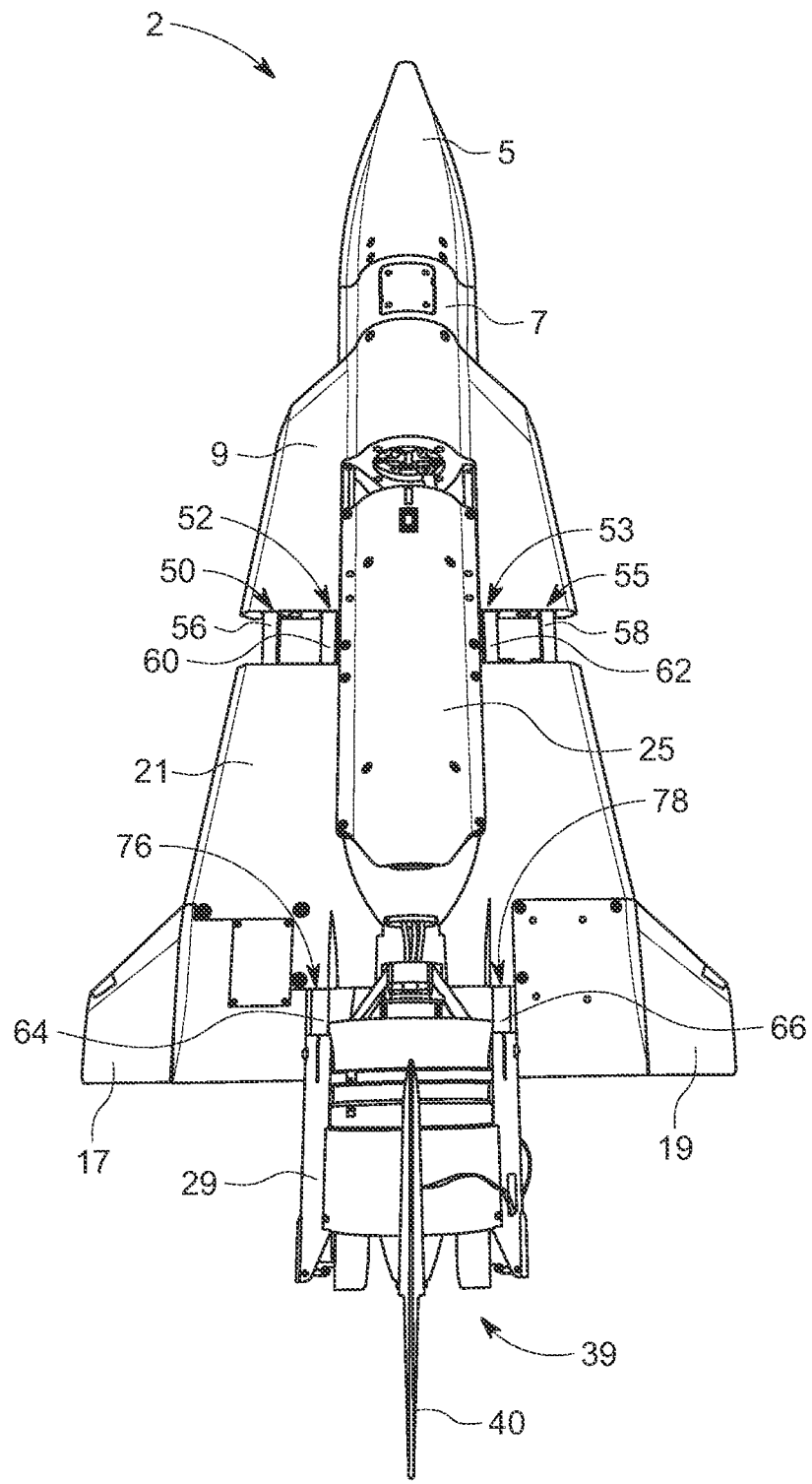
FIG. 2 is a three-dimensional top perspective view of an aircraft with modular components having fore and aft portions separated to reveal longitudinal tubes in accordance with some embodiments of the present disclosure.

FIG. 2 is a three-dimensional perspective view of an aircraft 2 with modular components having fore and aft portions separated to reveal longitudinal tubes in accordance with some embodiments of the present disclosure.

In some embodiments, one or more components of the aircraft may have at least one interior channel to accommodate and surround at least one reinforcing tube. A portion of a tube may pass through an aperture of the channel (e.g., wherein the aperture is positioned adjacent to a surface of the component of the aircraft that will be in contact with a surface of another component of the aircraft) and enter an interior volume of the channel and the component via the aperture.

A reinforcing tube may be fabricated from various materials, but in some embodiments, are a composite material, such as carbon fiber, fiber glass, or similar. A tube may be hollow, solid, or combinations thereof. A tube may have constant or variable dimensions. A tube may have various cross-sectional profiles. In the figures, tubes are depicted as having rectangular cross-sections, but other shapes are possible, such as circular, multisided, or other profiles as may be apparent to one of ordinary skill upon reading of this disclosure.

A tube may be removable from a channel or may be fixed within a channel. In some embodiments, a tube may be fixed to or integrated into a component so that the tube is coupled to the component in an integrated or cantilevered manner.

Figure 8:
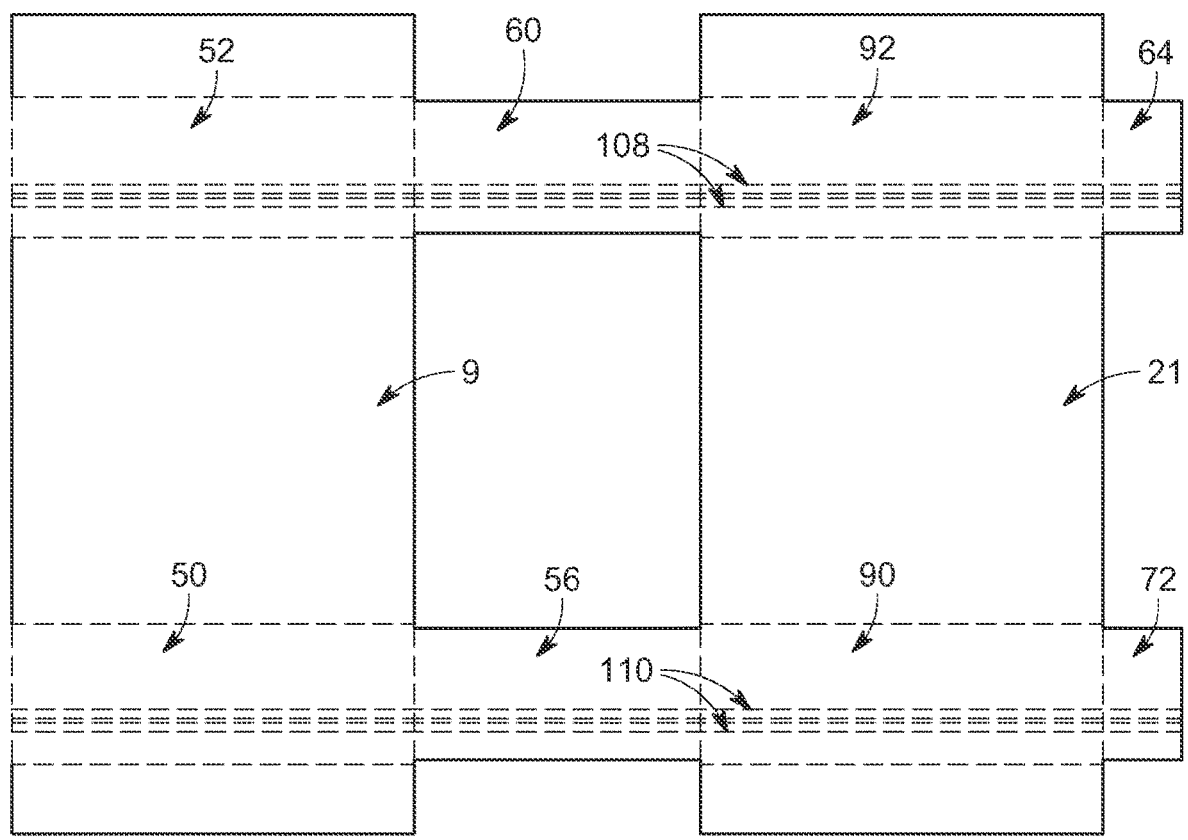
FIG. 8 is a top view of components of an aircraft with modular components separated to reveal longitudinal rods and internal wiring in accordance with some embodiments of the present disclosure.

Note that a component may slide with respect to the one or more tubes (e.g., within the one or more channels of the component) as the one or more tubes pass within at least one channel of the component, as further shown in FIG. 8. The component may slide along the one or more tubes until a contact surface of the component contacts a contact surface of another component. The components may be fixed in position (e.g., in contact with one another) in order to assemble the aircraft 2.

When the forward and aft fuselages are in contact with one another, respective channels of the forward and aft fuselages may be positioned adjacent to one another to form an essentially continuous channel within which a tube can be positioned. In addition, a tube may be completely contained within a channel of the aircraft and not visible to a viewer observing the aircraft. The forward fuselage and aft fuselage of the aircraft of FIG. 1 are separated from one another, as are the aft fuselage and propulsion tail. Thus, portions of the aforementioned tubes may be visible in gaps formed between the respective components of the aircraft.

One or more of a channel or tube may comprise one or more features for securing the tube within the channel. Such features may include one or more of: a detent; a catch; a latch; a pin; a spring; a friction surface or similar feature and may be positioned on or part of one or both of the channel and the tube. In an embodiment, one or more of such features may allow the tube to be releasably coupled in position within the channel. In some embodiments a tube may be uncoupled or "free" when positioned within the channel. Other configurations may be possible in some embodiments.

A channel may have various cross-sectional profiles, and such cross-sectional profiles may have varying dimensions along a length of the channel. In the embodiments of the figures, the channels have a rectangular cross-section of essentially constant width, but in other embodiments, other configurations are possible. Further details of the channels within aircraft components are shown and described with reference to FIGS. 6A-6B and 7A-7B.

As shown in FIG. 2, the aircraft 2 may have a forward fuselage 9, first aft fuselage 21, as well as a first fuel module 25 and first propulsion tail 29. The aircraft 2 has four longitudinal tubes 56, 58, 60 and 62 that are positioned within respective channels 50, 52, 53 and 55 of the forward fuselage 9. The tubes 56, 58, 60 and 62 are also positioned within channels of the aft fuselage 21, but the corresponding channels of the first aft fuselage 21 are not visible in FIG. 2. In this regard, the tubes 56, 58, 60 and 62 pass within channels 50, 52, 53 and 55 and corresponding channels of the first aft fuselage 21 to provide stability and improved support for the aircraft 2. In the embodiment of the figures, the tubes and channels are oriented essentially parallel to a longitudinal axis of the aircraft 2.

Four tubes and corresponding channels on respective forward and aft fuselages are depicted in FIG. 2, but other orientations and locations of both the tubes and channels are possible in some embodiments. In addition, while the forward and aft fuselages are depicted as having tubes and channels, other components (e.g., elevons 35, 37) may have channels for receiving tubes and connecting with one or more other components of the aircraft 2. Two are positioned on a port side of the aircraft, and two are positioned on a starboard side of the aircraft. In some embodiments, the aircraft may have different numbers of tubes on one or both of the port and starboard sides of the aircraft. As an example, in an embodiment, the aircraft may have one tube on one side (e.g., starboard) and two or more on the other side (e.g., port). In an embodiment, an aircraft may have one tube coupling the forward and aft fuselage, but none on the other side of the aircraft, and the one tube may be located either on a port or starboard side of the aircraft. Additional detail is shown below with regard to FIGS. 6A-6B.

Figure 4:
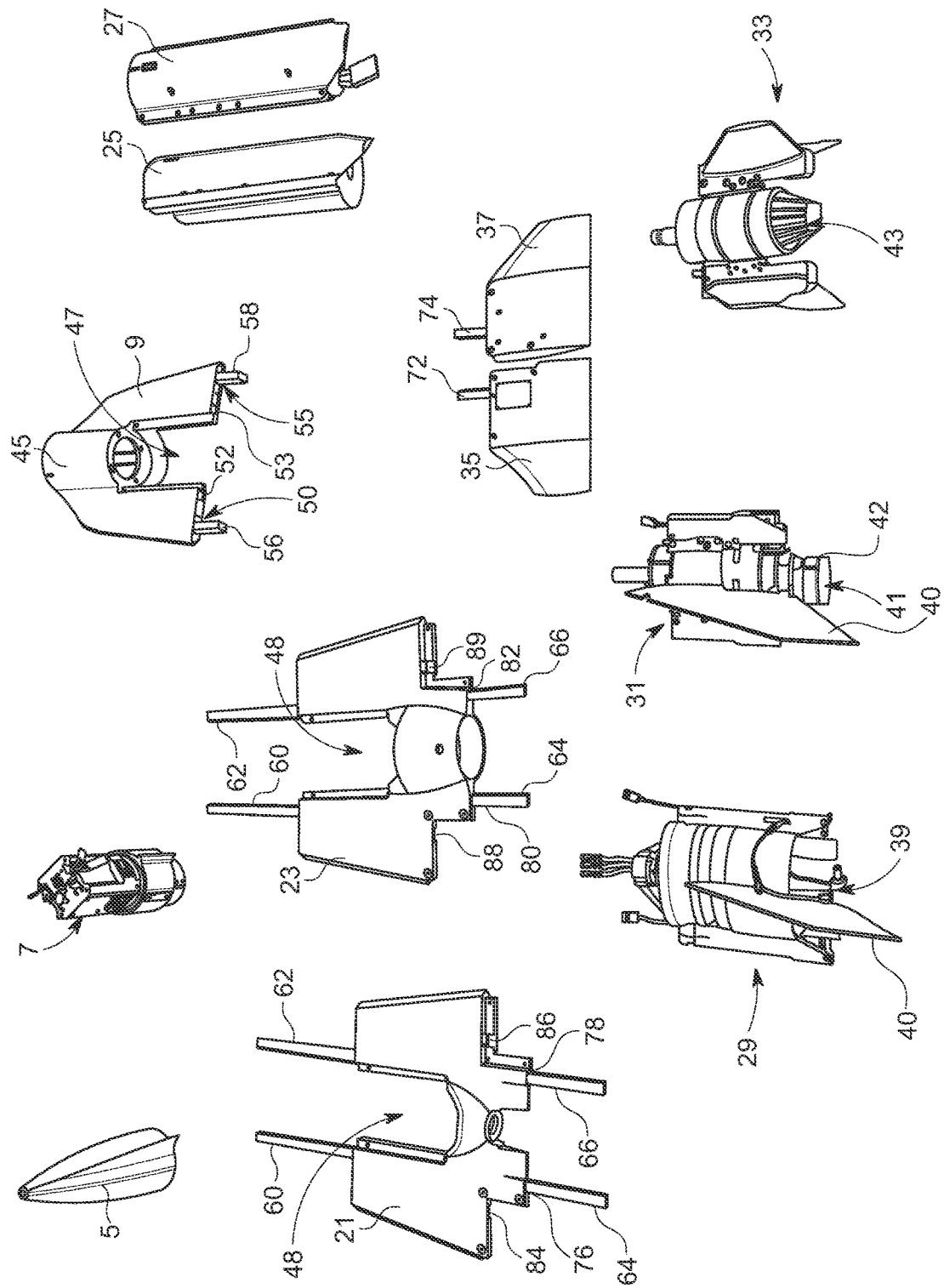
FIG. 4 is a three-dimensional top perspective view of an aircraft with modular components separated in accordance with some embodiments of the present disclosure.

In addition, with brief reference to FIG. 4, aft fuselage 21 and propulsion tail are coupled by tubes 64 and 66 in respective channels 76, 78, 80 and 82 of the aft fuselage 21 and corresponding channels of propulsion tail 29 (not specifically shown in FIG. 2). One or more tubes may pass from integrated channels of the aft fuselage through channels of the propulsion tail, also not specifically shown in FIG. 2. If aft fuselage and propulsion tail were separated, portions of tubes coupling the two components may be visible.

Figure 3:
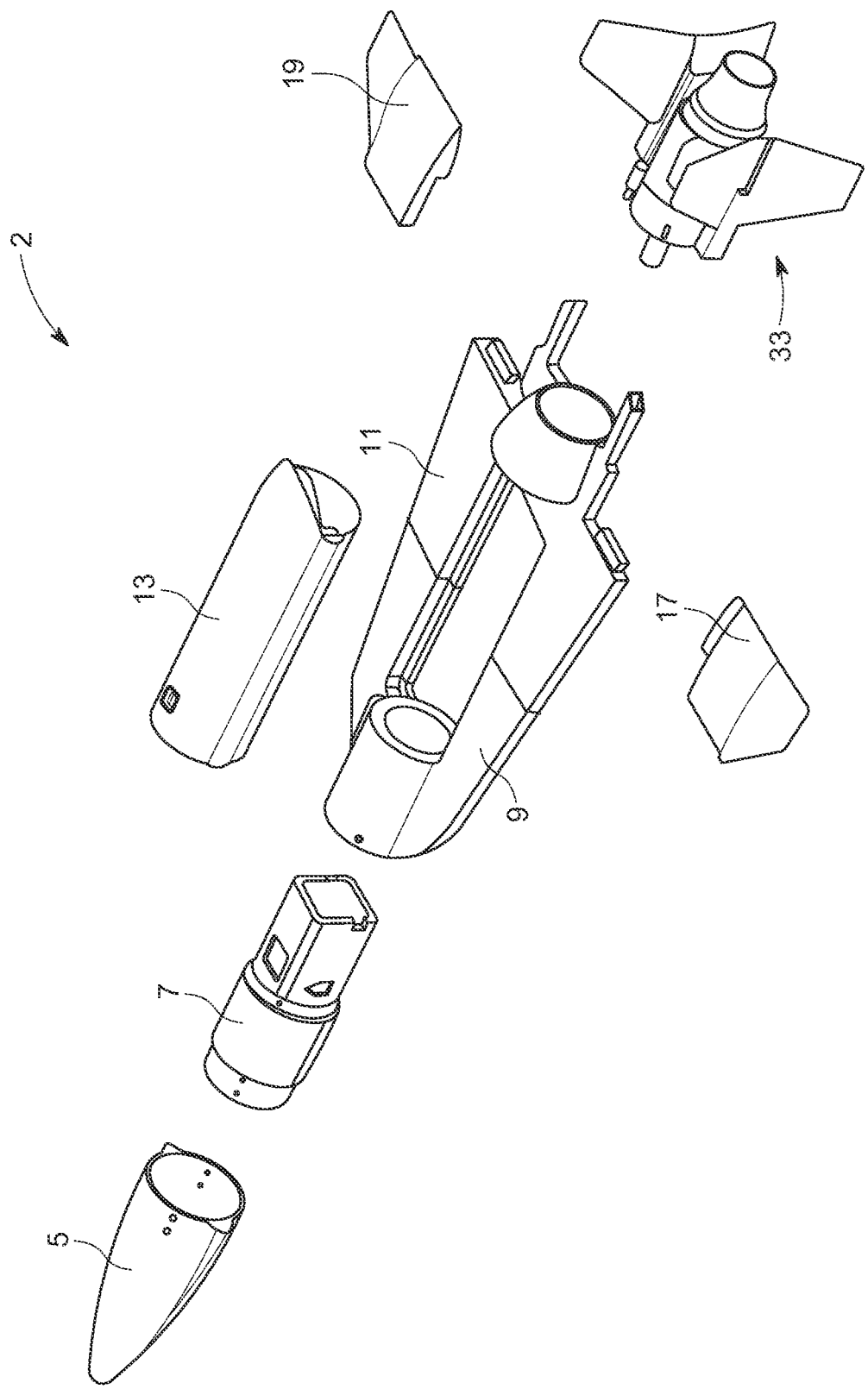
FIG. 3 is a three-dimensional side perspective view of assorted components of an aircraft with modular components separated in accordance with some embodiments of the present disclosure.

FIG. 3 is a three-dimensional perspective view of an aircraft with modular components separated in accordance with some embodiments of the present disclosure. The view of FIG. 3 is an exploded view showing a general orientation of various components of the aircraft relative to one another, provided for context and illustration of the orientation of parts relative to one another.

Figure 5A:
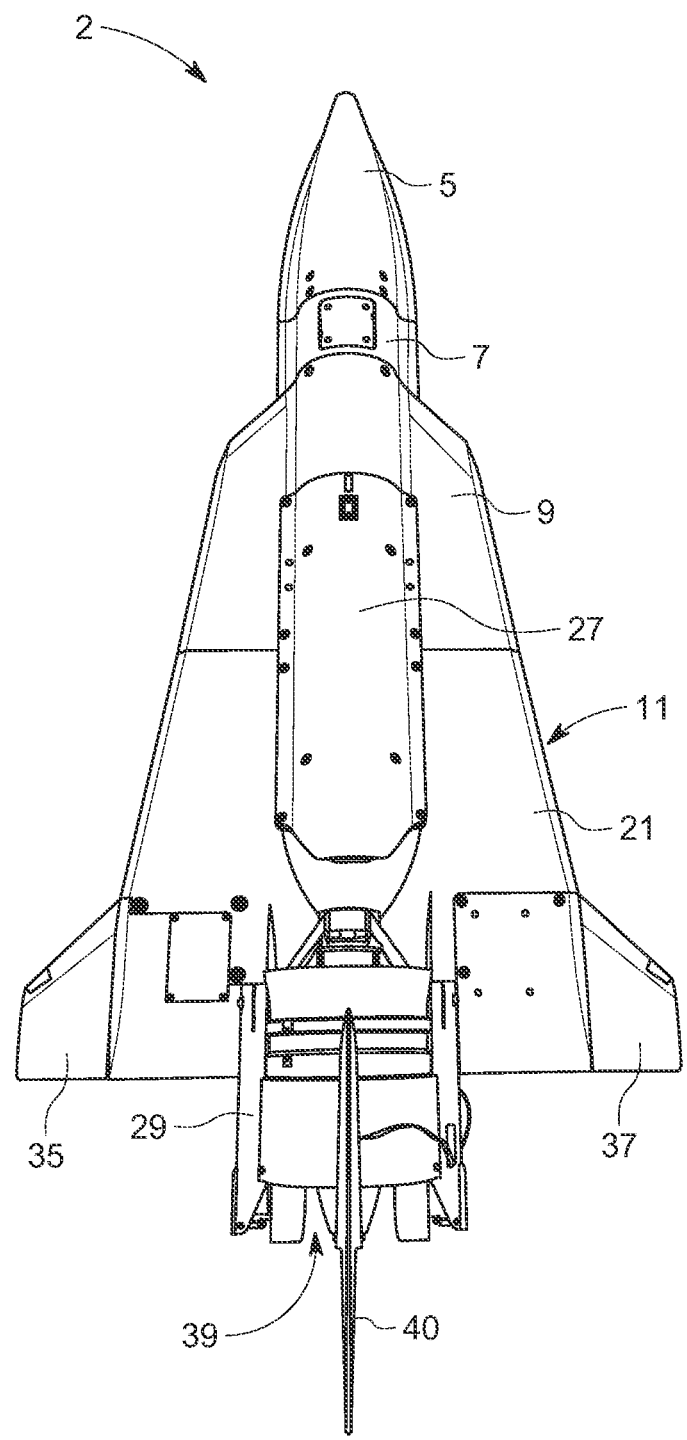
FIGS. 5A-5C depict various three-dimensional top perspective views of an aircraft with various propulsion modules attached in accordance with the present disclosure.
Figure 5B:
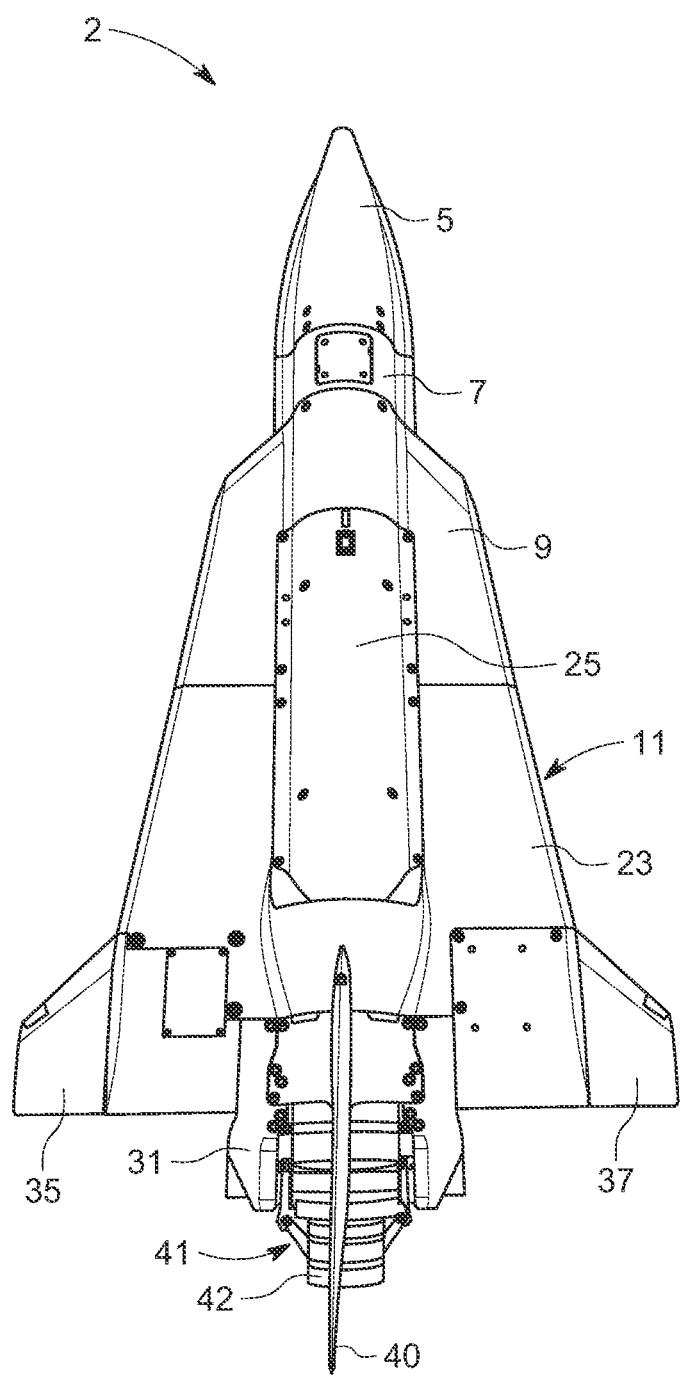
Figure 5C:
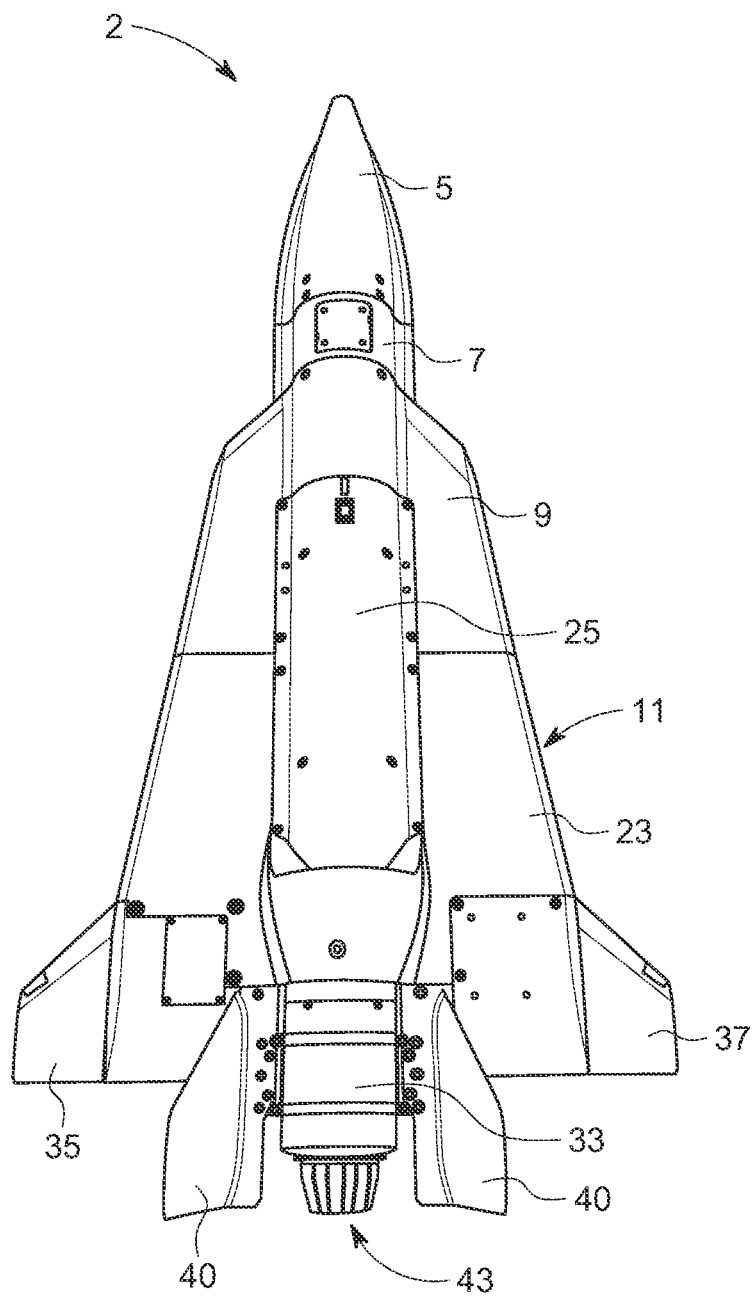

FIG. 4 is a three-dimensional perspective view of assorted components of an aircraft 2 with modular components in accordance with some embodiments of the present disclosure. FIG. 3 shows various types of modular components of the aircraft 2, with several different potentially interchangeable versions of various components of the aircraft 2 shown. Some, or all, of the components included within FIG. 4 may be interchangeable depending on a desired configuration of the aircraft 2 in some embodiments. FIG. 4 depicts a payload housing 5, an avionics housing 7, forward fuselage 9, first aft fuselage 21, second aft fuselage 23, first fuel module 25, second fuel module 27 (e.g., a battery for a propulsor with electric motor), first propulsion tail 29, second propulsion tail 31, third propulsion tail 33, first elevon 35 and second elevon 37. The components may be fitted together interchangeably in order to assemble aircraft 2 in a desired configuration (e.g., as in FIGS. 1 and 2). As illustrated in FIG. 5A, a first embodiment of the aircraft 2 may comprise the payload housing 5, the avionics housing 7, the forward fuselage 9, the first aft fuselage 21, the second fuel module 27, the first propulsion tail 29, the first elevon 35, and the second elevon 37. As illustrated in FIG. 5B, a second embodiment of the aircraft 2 may comprise the payload housing 5, the avionics housing 7, the forward fuselage 9, the second aft fuselage 23, the first fuel module 25, the second propulsion tail 31, the first elevon 35, and the second elevon 37. As illustrated in FIG. 5C, a third embodiment of the aircraft 2 may comprise the payload housing 5, the avionics housing 7, the forward fuselage 9, the second aft fuselage 23, the first fuel module 25, the third propulsion tail 33, the first elevon 35, and the second elevon 37. The components shown in FIGS. 4-5C are exemplary, and other components are possible in some embodiments.

Payload housing 5 may be configured to contain various payloads and may have dimensions selected to enclose and secure contents for flight operations. In some embodiments, exemplary contents within payload housing may include one or more of each of: a weapon; an electronic device; a sensor; a parachute; fuel; and cargo. Other types of payloads are possible. In the embodiment of the figures, the payload housing 5 is configured as a nose of aircraft 2, and is coupled to avionics housing 7. In some embodiments, all or a portion of the avionics of the aircraft may be positioned with in the payload housing 5. The payload housing 5 may have various suitable shapes and may be configured for enclosing various contents in some embodiments.

Avionics housing 7 may be configured to contain all or a portion of avionics components of the aircraft 2, including one or more of various processors, memory, flight electronics, sensors, and flight control communication devices of aircraft 2. The avionics components may also be referred to herein as an avionics module or an avionics flight control module. Avionics components of the aircraft 2, whether within the avionics housing 7 or not, may be coupled to receive power, such as from a battery or other power source of the aircraft 2, which may be located within a fuel module or other location within an airframe of the aircraft 2. In some embodiments, the avionics components may be positioned between and coupled to one or more of payload housing 5 and forward fuselage 9 when the aircraft is assembled. Although not shown in the figures, in some embodiments, one or more rods may pass through one or more channels of the avionics housing 7 and/or payload housing 5 when the aircraft 2 is assembled.

Forward fuselage 9 may be positioned between and coupled to avionics housing 7 and one or more of a fuel module and aft fuselage of aircraft 2. In some embodiments, a portion of avionics components of the aircraft 2 may be positioned within a portion of forward fuselage 9. In the embodiment of the figures, a portion of the avionics for aircraft 2 is positioned within a diameter of an essentially cylindrical portion 45 of the forward fuselage 9 and may be inserted into the portion of the forward fuselage 9 when the aircraft 2 is assembled and removed when disassembled. In some embodiments, the forward fuselage 9 may have forward fuel module gap 47 to accommodate a fuel module of the aircraft. In some embodiment, the forward fuel module gap 47 of the forward fuselage and an aft fuel module gap 48 of the aft fuselage may define a region configured to support and couple to a fuel module of the aircraft 2.

The forward fuselage 9 of FIG. 4 has a plurality of channels 50, 52, 53 and 55 located on an interior region of the forward fuselage 9 and a plurality of tubes 56, 58 passing through apertures of two of its outermost channels (channels 50 and 55).

The tubes 56, 58 may be positioned within channels 50 and 55. The tubes 56, 58 may be coupled to the forward fuselage 9, such as to one or more surfaces of channels 50 and 55, or other surfaces of forward fuselage 9. The tubes may protrude from the forward fuselage 9 to pass into a channel of another component, such as aft fuselages 21, 23. In this regard, the tubes 56, 58 may pass through apertures of respective channels (not specifically shown in FIG. 4) of the first aft fuselage 21 or second aft fuselage 23 and may be positioned within such channels when the aircraft is assembled such that first aft fuselage 21 or second aft fuselage 23 are in contact with the forward fuselage 9.

Fuel module 25 and second fuel module 27 represent different types of fuel. Fuel module 25 is configured for storing and providing aviation motor fuel (e.g., kerosene, jet fuel, etc.) to a turbojet propulsor when aircraft is configured for use with propulsor 31 (e.g., a combustible fuel-based turbojet engine 41 with thrust vector nozzle 42 and a vertical fin 40) or propulsor 33 (e.g., a combustible fuel-based turbojet engine 43 without thrust vector, but with vertical side fins 40). The combustible fuel-based turbojet engines 41, 43 may also be referred to herein as combustible fuel-based propulsion modules 41, 43 or turbojet motors 41, 43. Fuel module 27 is configured for storing and providing electric power to an electric propulsor when aircraft is configured for use with propulsor 29 (e.g., an electric propulsor 39 with a vertical fin 40). The electric propulsor 39 may also be referred to herein as an electric propulsion module 39. Fuel module 13 contains resources required to power propulsor of aircraft, and can be physical fuel, solid or liquid or battery in some embodiments. May include batteries, and when aircraft is electrically powered, may have only batteries. May have battery fuel combo in some embodiments. May be coupled to fuel lines, conductive wiring when providing power to resources of the aircraft, including propulsors, avionics hardware, flight controller, sensors, communications interfaces and devices, lighting, etc.

Fuel modules 25, 27 may couple to portions of forward and aft fuselages, and may be disposed within interior gap 47, 48 formed when forward and aft fuselages are coupled together. Although not specifically shown, fuel modules 25, 27 may have at least one channel and may be secured to one or both of the fore and aft fuselages via at least one tube. In other embodiments, the fuel modules may be positioned so that at least one tab on at least one side of the module is positioned within a track of one or both of the fore and aft fuselages. In some embodiments, the module may be secured to one or both of the fore and aft fuselage, at least one stabilizing tube, or other component of the aircraft via one or more fasteners (e.g., screws, rivets, etc.). Other features may be implemented to secure a fuel module, and different configurations are possible depending on a fuel type needed to power a desired propulsor.

Aft fuselages 21, 23 may be configured to couple to and support different types of propulsors and associated fuel modules. Aft fuselage 21 may be configured for use with an electric fueled propulsor 39 (e.g., of the first propulsion tail 29) and fuel module 27 configured to store electric power while aft fuselage 23 may be configured for use with a jet fueled propulsor 41, 43 and fuel module 25 configured to store jet fuel, kerosene, etc. Features of the aft fuselages may be altered for compatibility with a desired propulsor and fuel needed to power the propulsor.

In FIG. 4, aft fuselage 21 has rods 60 and 62 protruding from a bow-side surface of the aft fuselage 21. The rods 60 and 62 may be configured to pass into channels 52 and 53 of fore fuselage 9. A void or recessed region 48 may accommodate a fuel module 25, 27. The aft fuselage 21 has channels 84, 76, 78 and 86 with apertures on an aft side of the fuselage 21. Rods 64 and 66 protrude from the aft-side surface of the fuselage 21 and may be configured to pass within channels of a propulsor (e.g., propulsor 29, 31, or 33) when coupled together.

Similarly, aft fuselage 23 has essentially identical rods 60 and 62 protruding from a bow-side surface of the aft fuselage 23. The rods 60 and 62 may be configured to pass into channels 52 and 53 of fore fuselage 9. A void or recessed region 48 may accommodate a fuel module 25, 27. The aft fuselage 23 has channels 88, 80, 82 and 89 with apertures on an aft side of the fuselage 23. Rods 64 and 66 protrude from the aft-side surface of the fuselage 23 and may be configured to pass within channels of a propulsor (e.g., propulsor 29, 31, or 33) when coupled together.

In an embodiment, aft fuselages 21, 23 may be configured to couple to elevons 35, 37 and at least one aircraft propulsion tail, 29, 31, and 33. An elevon may be coupled to notched recessed portions of an aft fuselage, and may have tubes 72, 74 protruding from surfaces. In certain optional embodiments, aft fuselages 21, 23 may have 180-degree rotational symmetry about an axis defined through the aft fuel module gap 48. Such symmetry may mean that the notch of the recessed portions may be on top or bottom of the aircraft 2 depending upon which side, and as such, identical elevons 35, 37 (rather than side specific elevons) may be used, thus further simplifying the various possible assemblies of the aircraft 2. In addition to surfaces of the fore and aft fuselages, elevons may act as flight control surfaces of aircraft 2. Elevons have servos in communication with and controlled by flight controller, described below, and may include hardware for adjusting position of elevons during flight and thereby controlling aircraft attitude. Servos may be positioned within a surface area of the elevon, and may be coupled to receive power from fuel module of the aircraft.

Propulsors 29, 31, 33 may comprise various aircraft motors including turbojet, electric motor, etc. In some embodiments, a propulsor may have a directional thrust nozzle.

A propulsor may be configured to couple to aft portion of aft fuselage and may comprise one or more flight control surfaces (e.g., one or more vertical fins 40). In some embodiments, a propulsor may have components permitting the aircraft to perform vertical takeoff and landing or traditional horizontal takeoff and landing. In some embodiments, the aircraft 2 may be configured to launch when sitting on its propulsion tail, with a longitudinal axis of the aircraft approximately perpendicular to a surface on which the aircraft is sitting. A propulsor may have other components in other embodiments. In some embodiments, such propulsor may have components for coupling the propulsor electrically to batteries of the fuel module to provide electrical power to the propulsor or may couple to receive fuel from fuel module to power the propulsor.

In some embodiments, the propulsor also may have flight control surfaces comprising one or more servos configured to control position of the flight control surfaces to aid in controlling attitude of the aircraft 2.

In some embodiments, the aircraft 2 may be fabricated using three-dimensional printing techniques. This may allow users to configure, fabricate and install components for the aircraft 2 without waiting for request processing, fabrication, packaging, shipment and delivery of a needed component. In some embodiments, the aircraft 2 may have airframe components (e.g., payload housing 5, avionics housing 7, forward fuselage 9, aft fuselage 11, fuel module 13, propulsion tail 15, and elevons 17, 19) fabricated from polyethylene terephthalate glycol (PETG, CAS No. 63407-54-5), but other materials are possible. Components of propulsors (e.g. nozzle, housing, etc.) may be fabricated using various materials, but in some embodiments all or a portion of a propulsor may comprise 316 stainless steel (CAS No. 65997-19-5).

Figure 6A:
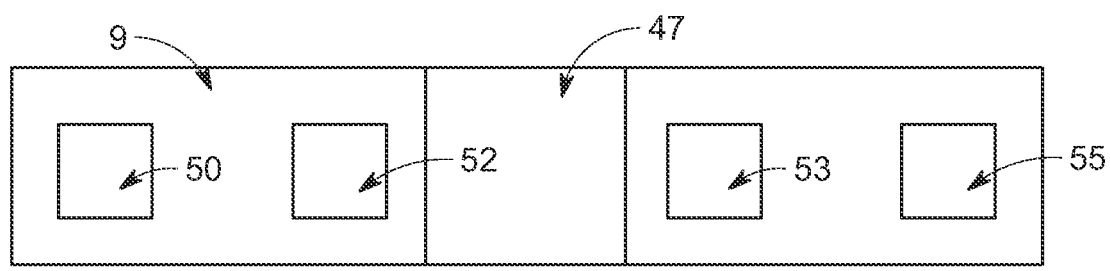
FIGS. 6A-6B depict channels in components of an aircraft with modular components in accordance with some embodiments of the present disclosure.
Figure 6B:
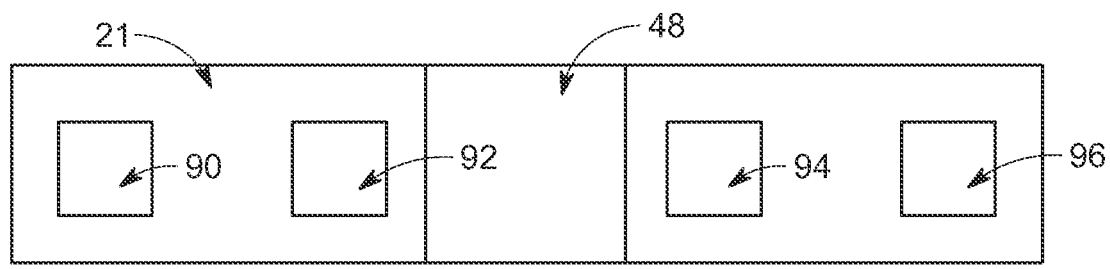
Figure 7A:
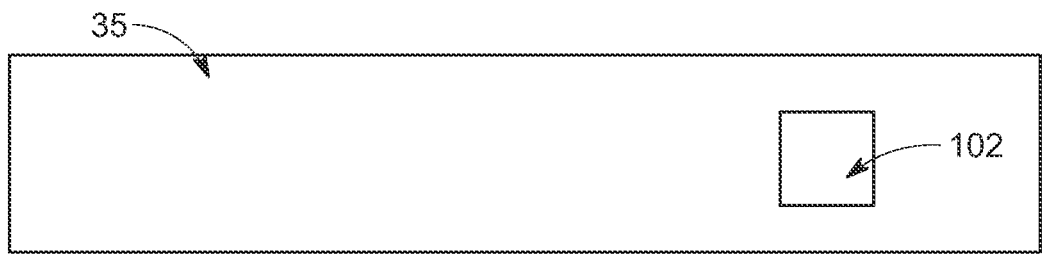
FIGS. 7A-7B depict channels in components of an aircraft with modular components in accordance with some embodiments of the present disclosure.
Figure 7B:
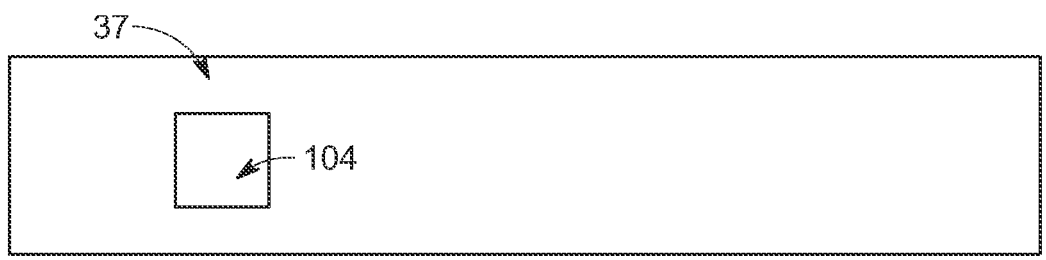

FIGS. 6A-6B depict views of mating channels in components of an aircraft with modular components, FIGS. 7A-7B depict channels in components, and FIG. 8 is a top view of components of an aircraft with modular components separated to reveal longitudinal rods and internal wiring in accordance with some embodiments of the present disclosure. FIGS. 6A-6B and 7A-7B show surfaces of the respective components that may be in contact with other components of the aircraft when it is assembled. The figures are not necessarily to scale, but are meant to illustrate exemplary positioning and locations of channels in components of the aircraft.

FIG. 6A illustrates locations of apertures of channels 50, 52, 53 and 55 of forward fuselage 9, and FIG. 6B illustrates locations of apertures of channels 90, 92, 94 and 96 of aft fuselage 21. The forward fuselage 9 of the embodiment of FIG. 4 has tubes 56 and 58 respectively protruding from channels 50 and 55, although the tubes are not shown in FIGS. 6A-6B. The aft fuselage 21 of FIG. 4 has tubes 60 and 62 protruding from channels 92 and 94. Regions 47 and 48 are shown, not to scale, for contextual purposes.

Similarly, FIGS. 7A-7B show side-perspective views of elevons 35 and 37, respectively, with apertures of channels 102 and 104 visible. The elevons 35 and 37 of FIG. 4 have tubes 72 and 74 protruding from their respective channels 102 and 104. In some embodiments, the tubes 72 and 74 (as with other tubes of the aircraft 2) may be removable. The tubes 72 and 74 may be inserted into channels 84, 86, on aft fuselage 21 or channels 88 and 89 on aft fuselage 23. Further, the tubes 72 and 74 may be hollow and used as passageways for wiring, as further discussed in the following paragraphs. Note that certain features such as fasteners and fastener apertures are not necessarily shown in FIGS. 7A-7B.

FIG. 8 shows tubes passing through channels of two components of the aircraft, and importantly, ability of tubes to serve as conduit for internal routing of aircraft wiring 108, 110. FIG. 8 shows tube 56 passing through channel 50 of forward fuselage 9 and channel 90 of aft fuselage 21. Tube 60 is passing through channel 52 of forward fuselage 9 and channel 92 of aft fuselage 21. A portion of tube 64 is visible, as is a portion of tube 72 (although elevon 35 is not shown).

Tubes of the aircraft 2 may serve as conduit for internally routing wiring throughout the aircraft. Wiring coupling one or more resources of the aircraft 2 (e.g., resources depicted in FIG. 10, an accelerometer, avionics resources, servos associated with one or more flight control surfaces, propulsors, etc.) conductively, communicatively, or otherwise may be run through an interior volume of a tube. In some embodiments, wiring may pass from an interior of a first tube (e.g., from tube 60) to an interior of one or more other tubes (e.g., to tube 64). In some embodiments, a tube may have ports or holes allowing internal wiring to pass from an interior volume of the tube to couple to at least one resource of the aircraft 2. The port or hole (not specifically shown) may have a grommet or seal, and may have various shapes or profiles, such as circular, oval, multi-sided, or otherwise.

In FIG. 8, aircraft wiring 108 and 110 passes through an interior volume of the tubes 56, 60, 64 and 72. Although a particular arrangement and number of wiring is depicted in FIG. 8, it will be understood that positioning and configuration of wiring may be varied as desired to facilitate operation of an aircraft having a particular configuration and associated resources.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art.

The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. An aircraft, comprising:
   a forward fuselage;
   an aft fuselage;
   at least one first tube projecting from the forward fuselage and configured to pass through a first channel, wherein the first channel passes through a portion of the aft fuselage;
   at least one second tube projecting from the aft fuselage and configured to pass through a second channel, wherein the second channel passes through a portion of the forward fuselage;
   a fuel module coupled to fuel a propulsion module of the aircraft, wherein the propulsion module is positioned within a propulsion tail of the aircraft; and
   an elevon coupled to the aft fuselage and at least one fourth tube projecting from the elevon and configured to pass through a fourth channel, wherein the fourth channel passes through a second portion of the aft fuselage.

2. The aircraft of claim 1, further comprising at least one third tube projecting from the aft fuselage and configured to pass through a third channel, wherein the third channel passes through a portion of the propulsion tail.

3. The aircraft of claim 1, wherein a fuel module bay is positioned within the aft fuselage and the forward fuselage.

4. The aircraft of claim 1, further comprising a second elevon coupled to the aft fuselage and at least one fifth tube projecting from the second elevon and configured to pass through a fifth channel, wherein the fifth channel passes through a third portion of the aft fuselage.

5. The aircraft of claim 1, wherein the propulsion tail has at least one vertical fin.

6. The aircraft of claim 1, wherein the propulsion tail configured for vertical aircraft launch.

7. The aircraft of claim 1, wherein the propulsion module comprises a turbojet motor, and wherein the fuel module comprises one or more of: kerosene, Jet Propellant 8, and diesel fuel.

8. The aircraft of claim 1, wherein the propulsion module comprises an electric motor, wherein the electric motor comprises a brushless electric motor, and wherein the fuel module comprises a battery.

9. The aircraft of claim 1, wherein the propulsion module comprises a thrust vectoring nozzle.

10. The aircraft of claim 1, further comprising an avionics housing configured to be coupled to a portion of the forward fuselage.

11. The aircraft of claim 10, wherein the avionics housing is configured to be coupled to the portion of the forward fuselage opposite the aft fuselage.

12. The aircraft of claim 10, wherein the avionics housing is configured to contain flight control avionics components.

13. The aircraft of claim 1, further comprising a payload housing configured to be coupled to a portion of the forward fuselage.

14. The aircraft of claim 13, wherein the payload housing is configured to be coupled to the portion of the forward fuselage opposite the aft fuselage.

15. The aircraft of claim 13, further comprising an avionics housing coupled between the payload housing and the forward fuselage.

* * * * *